F. A. LONG.
STUMP BORING MACHINE.
APPLICATION FILED OCT. 14, 1913.
1,127,047.
Patented Feb. 2, 1915.
3 SHEETS—SHEET 1.
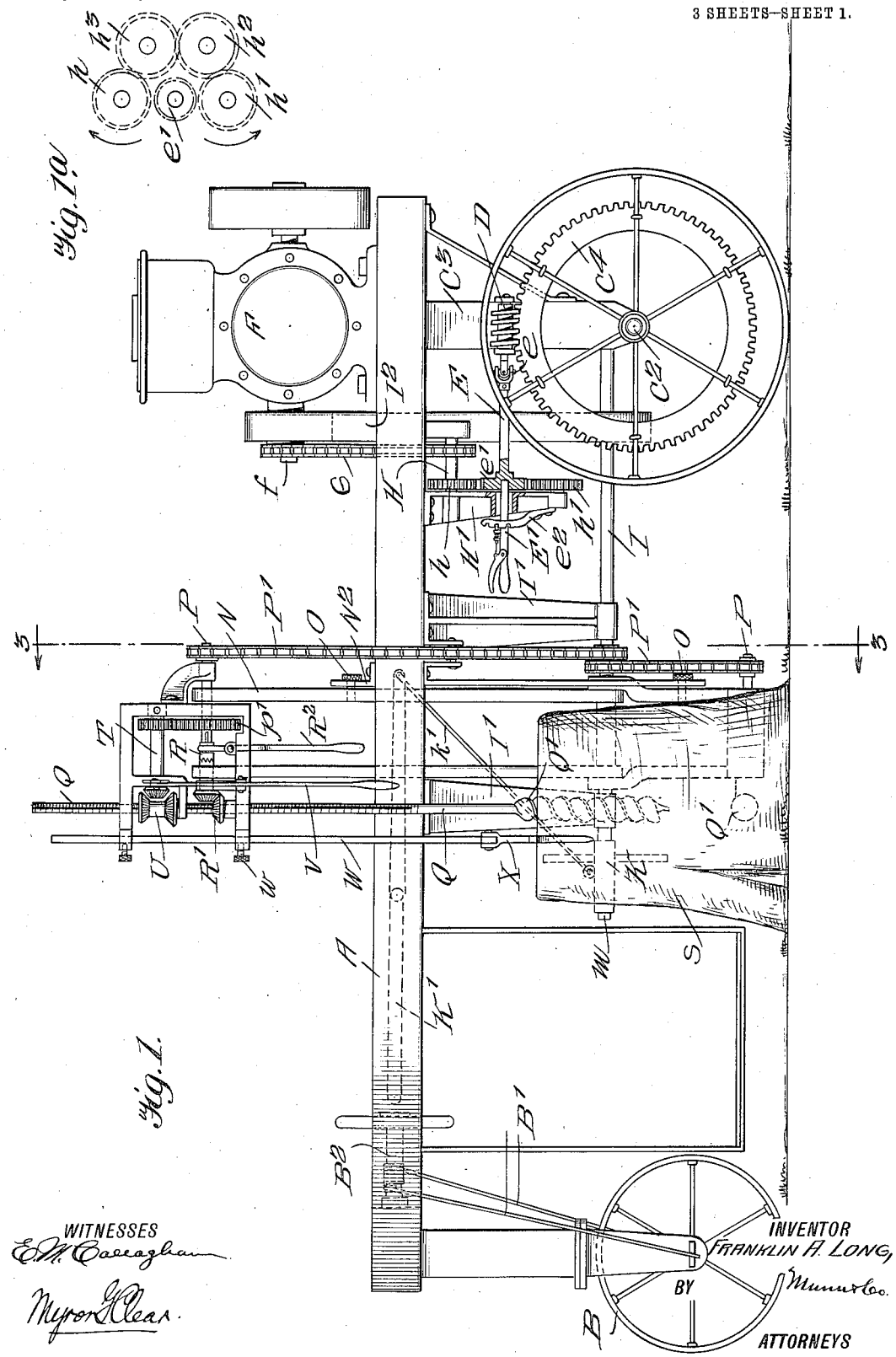
WITNESSES
INVENTOR
FRANKLIN A. LONG,
BY
ATTORNEYS

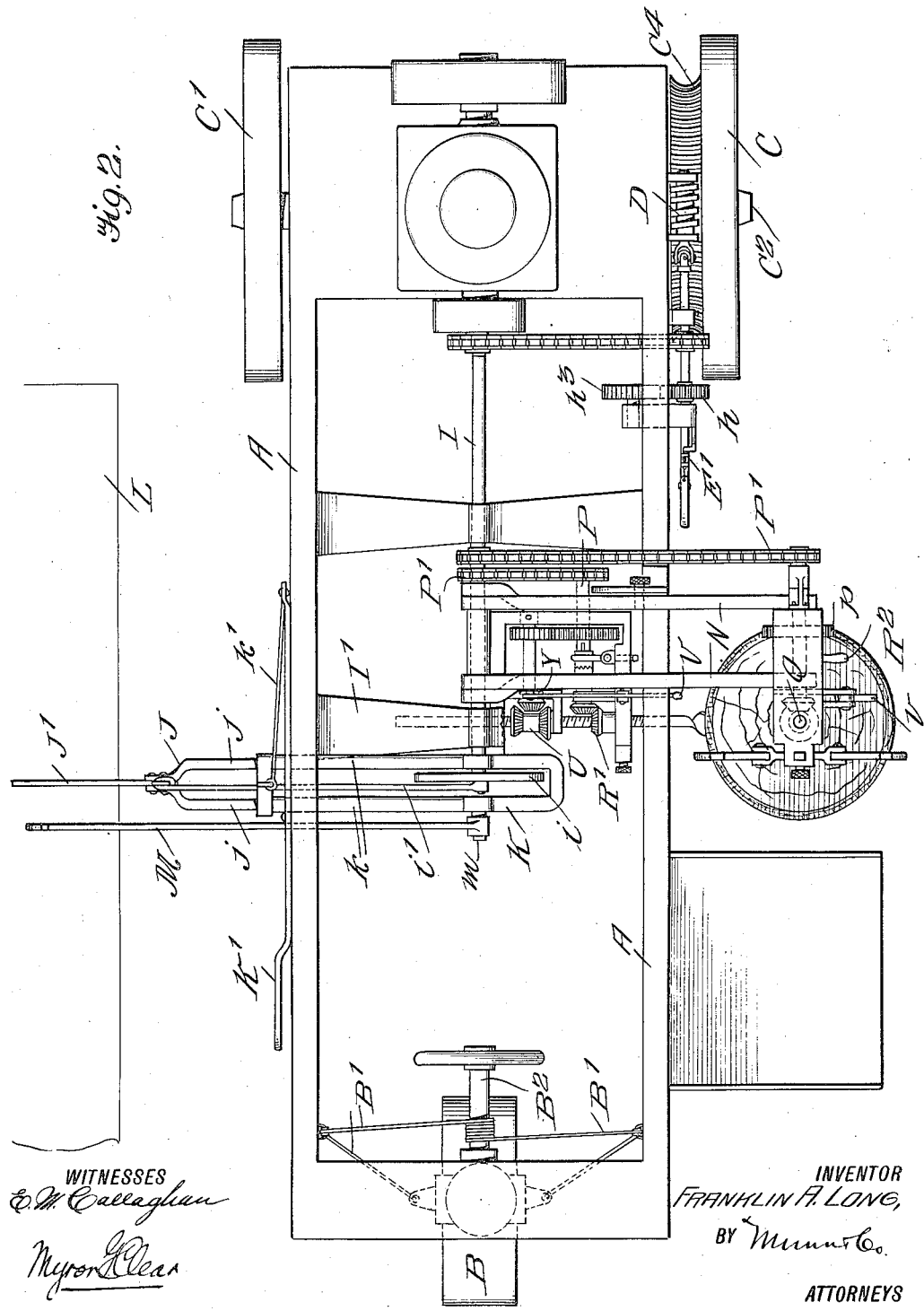

F. A. LONG.
STUMP BORING MACHINE.
APPLICATION FILED OCT. 14, 1913.
1,127,047.
Patented Feb. 2, 1915.
3 SHEETS—SHEET 3.
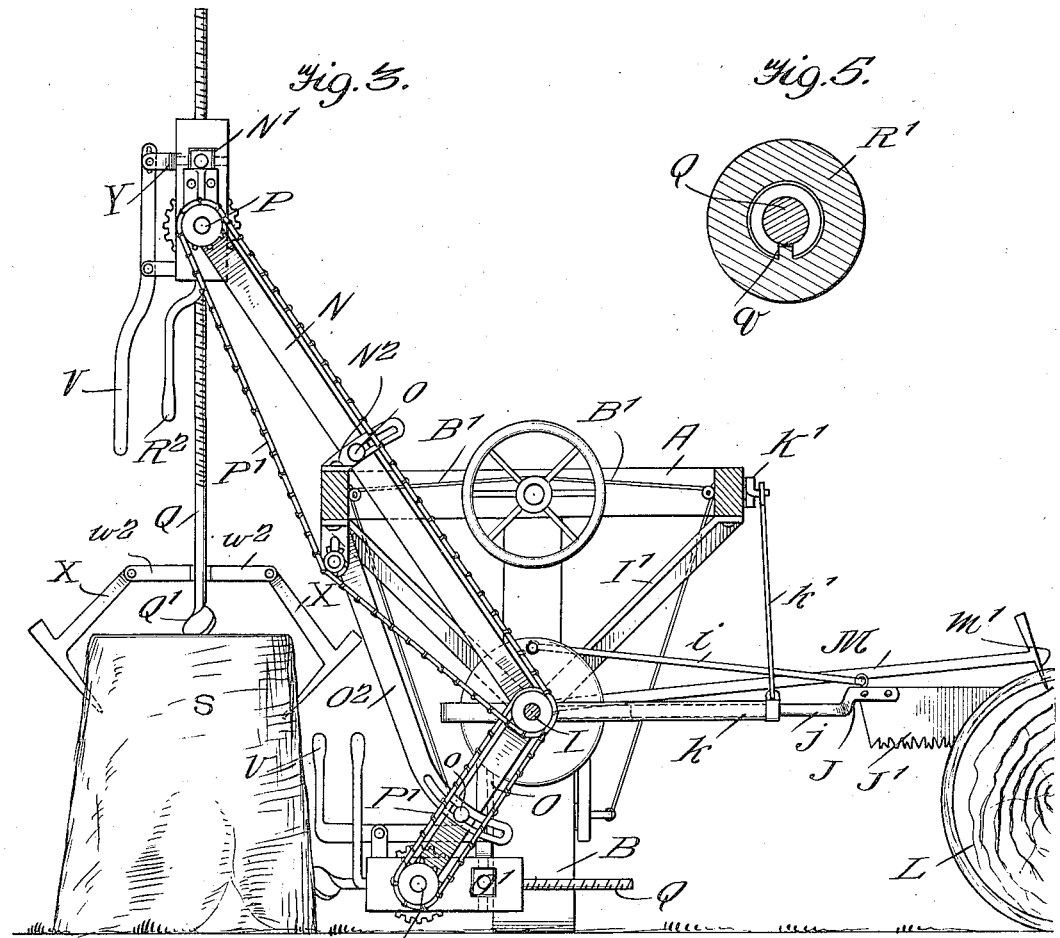
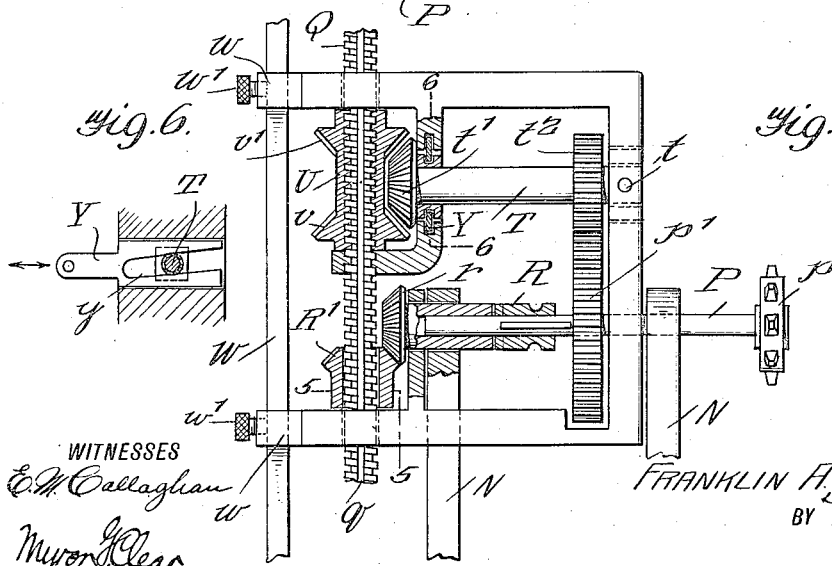
WITNESSES
E. M. Callaghan
Myron J. Clear
INVENTOR
FRANKLIN A. LONG,
BY Munn & Co.
ATTORNEYS

UNITED STATES PATENT OFFICE.

FRANKLIN A. LONG, OF EUREKA, MONTANA.

STUMP-BORING MACHINE.

1,127,047. Specification of Letters Patent. Patented Feb. 2, 1915.

Application filed October 14, 1913. Serial No. 795,070.

*To all whom it may concern:*

Be it known that I, FRANKLIN A. LONG, a citizen of the United States, and resident of Eureka, in the county of Lincoln and State of Montana, have invented an Improvement in Stump-Boring Machines, of which the following is a specification.

My present invention relates to machines for clearing land, and more particularly to a machine especially adapted to operations upon stumps and thrown logs for the purpose of permitting effective fires to be started in the stumps and cutting the logs into sections which may be utilized to feed the stump fires.

The object of my invention is to provide a single portable machine combining a saw and certain boring tools which may be simultaneously operated and readily transported from place to place in order that they may be properly positioned with respect to the stumps and logs to be operated upon.

In the accompanying drawing which illustrates my invention and forms a part of this specification, Figure 1, is a side elevation of my improved machine. Fig. 1ª, is a diagrammatic view illustrating the reversing gear arrangement of the transmission mechanism. Fig. 2, is a plan view. Fig. 3, is a vertical transverse section taken substantially on line 3—3 of Fig. 1. Fig. 4, is a detail view, partly broken away and in section of the upper boring head. Fig. 5, is a detail cross section through the boring head taken substantially on line 5—5 of Fig. 4, and Fig. 6, is a detail vertical section taken through the boring head substantially on line 6—6 of Fig. 4.

Referring now to these figures, the frame A of my improved machine is substantially rectangular in form and supported at its forward end by means of a lower caster wheel B to opposite side projections of which are connected the lower ends of flexible connections B' extending from a rearwardly projecting steering post B². The rear end of the frame is supported upon side wheels C and C' mounted upon opposite ends of a rear axle C², this axle being carried by the lower ends of depending supports C³. To the wheel C is secured a worm wheel C⁴ in mesh with which is a worm D this worm being mounted upon a two-part shaft E, the parts of which are connected by a universal joint e, and that part of the shaft to which the worm is directly connected being mounted through laterally projecting ears of one of the supports C³ as particularly shown in Figs. 1 and 2. Upon the outer end of the opposite portion of shaft E is carried a gear wheel e', this end of the shaft having a socket in which extends one end of an adjusting lever E' provided with a latch mechanism in engagement with a notched arm e² and movable to adjust the gear carrying portion of shaft E and to lock the same in desired position.

Upon the rear portion of the frame A at a point substantially alined above the rear axle C² is a suitable motor F, the driving shaft f of which is connected, by a sprocket chain G and wheels, to a shaft H journaled beneath the frame A upon a bracket H' and having a gear h located thereon directly above the gear e' before mentioned. Journaled also upon a stud shaft carried by the lower end of the bracket H' and located below the before mentioned gear e' is a gear h' in mesh with the lower gear h² of a pair of superposed meshing gears, the upper gear h³ of which is in mesh with the gear h before mentioned connecting the same with the gear h' at one side of the gear e'. Thus the gear e' is moved into engagement with gear h by upward movement of the forward portion of shaft E to drive the rear traction wheels in one direction and this direction may be reversed by moving the gears e' downwardly into engagement with the gear h'.

Disposed centrally below and longitudinally of the frame A and journaled in supporting hangers I' is the main driven shaft I for the operating devices, this shaft being connected, by suitable gear connections within a vertical boxing I², from the motor shaft f, the forward end of shaft I, terminating at a point slightly forward of the center of the machine and provided at its forward end with a crank disk i, the crank pin of which is connected by a pitman i' to a saw frame J to which the rear end of the reciprocating saw blade J' is connected, this saw frame having rearward extensions f slidable telescopingly within the tubular extensions k of a laterally projecting U-shaped guide K, pivotally supported adjacent its inner end upon the forward end of shaft I whereby it may be readily swung in a vertical direction by means of a flexible connection $k'$ depending from one end of a lever K' intermediately pivoted upon the adjacent side of the frame A. In this manner rotation of the main driven shaft I is converted into reciprocatory motion of the saw frame J, causing similar movement of the saw blade J' whereby to saw a thrown log such as indicated at L, the saw feeding through the log of its own weight and being readily movable in a vertical direction after a cut has been completed, by pressing downwardly upon the handle or free end of the lever K' whereby to swing the saw guide K upwardly.

The saw guide K may be provided adjacent its inner end and upon its forward side with a projecting pin $m$ on which is journaled the inner end of a laterally projecting spur bar M, the depending spur of the outer headed end $m$ of which is adapted to be driven into the fallen log in order to prevent relative movement of the log away from the machine during the sawing operation.

Journaled at their inner ends upon the main driven shaft I are adjustable supporting bars N and O respectively extending upwardly and downwardly from the said shaft and supporting the upper and lower boring heads N' and O', it being noted that these supporting bars are inclined laterally toward the same side of the frame A and the opposite side thereof with respect to the sawing device, the bars N and O being adjustably held by means of adjusting screws $n$ and $o$ respectively mounted through slotted bars $N^2$ and $O^2$ projecting upwardly and downwardly from the adjacent side of frame A.

Inasmuch as each of the boring heads N' and O' is similar in construction, a description of one thereof, preferably the boring head N', a more detailed illustration of which appears in Figs. 4, 5 and 6, will suffice for them both, it being noted however, that the boring heads N' and O' consist of rectangular frames through which are journaled driven shafts P having sprocket wheels $p$ connected by sprocket chains P' to sprocket wheels on the main shaft I and that these boring shafts P are mounted through the outer ends of the supporting bars N and O, due to which the boring heads are adjustable upon the outer ends of their said supporting bars. Each of the boring heads is provided with a threaded boring bar Q having a longitudinal key slot $q$ and a bit Q' at one end, the threaded portion of the boring bar passing through the frame of the boring head and being engaged within the frame of the head by a splined gear R' in mesh with a gear $r$ sleeved upon the inner end of shaft P and adapted to be connected therewith through a clutch member R, the position of which may be controlled through a lever $R^2$. Thus when the clutch member R is engaged by movement of lever $R^2$, rotation is transmitted from the shaft P to the boring bar Q in such a manner as to permit the latter to be fed into a stump such as indicated at S.

Mounted on the shaft P is a gear wheel $p'$ in mesh with the gear wheel $t^2$ on a shaft T within the frame of the boring head and pivoted therein at one end at a point $t$ in order to permit slight movement of its opposite end without disengaging the gears $p'$ and $t^2$ by which it is driven, the last mentioned end of the shaft being provided with a beveled gear $t'$ movable between the beveled geared portions $u$ and $u'$ of a sleeve U threaded on the boring bar and confined by portions of the boring head frame. Shaft T extends, at a point adjacent its gear $t'$, through a slot in the boring head frame in which slot is slidably mounted an adjusting guide Y, having an inclined slot $y$ through which shaft $t$ passes and being slidable through the actuation of a lever V so as to move shaft T to selected position to engage gear $t'$ with one of the geared portions of the sleeve U. As shown in Fig. 4 the gear $t'$ is in neutral position, in which position the boring bar is without movement in a longitudinal direction. As soon as lever V is actuated to move the guide B in one direction or the other, gear $t'$ is thrust into engagement with one of the geared portions $u$ and $u'$, causing rotation of the sleeve U which, being held from longitudinal movement, forces the boring bar to move in one direction. When it is desired to reverse this direction the lever V is moved in an opposite direction to cause engagement of gear $t'$ with the other geared portion of the sleeve U.

From Fig. 3 it will be clearly seen that the boring bar of the lower horizontal boring head is moved horizontally into the lower side portion of the stump, while the boring bar of the upper boring head is fed downward centrally into the stump, and from Figs. 1 and 2 it will be noted that these boring bars are in the same transverse plane of the machine. Thus the bores formed in the stump necessarily join at their inner ends even though they are not truly horizontal and vertical as a result of hilly ground around the stump and movement of the boring heads upon the ends of their supporting bars N and O.

In order to prevent excessive relative movement of the frame of the machine when positioned to bore a stump, the upper boring head may be provided with apertured side extensions $w$ through which a bar W is adjustably mounted by means of set screws $w'$, this bar W having extensions $w^2$ at its lower end to which are pivoted short spur bars X, the headed outer ends of these spur bars being provided with spurs which may be driven into opposite sides of the stump as best shown in Fig. 3.

Thus from the foregoing it will be seen that I provide a machine which is readily portable under its own power and may be quickly set up alongside a stump and adjacent a fallen log and its operating parts quickly adapted to the boring of the stump and the sawing of the log, and while the various mechanisms including the transmission boring mechanism and sawing mechanism may be varied as to their particular construction, it is to be understood that each of these mechanisms is necessary to a proper operation of the machine as a whole.

A machine of the character described may be utilized to clear land with a greatly reduced number of workmen than usually required for this purpose and at a proportionately great saving in cost and may itself be economically operated and quickly and readily set up in any desired position.

I claim:—

1. In a machine of the character described, the combination of a portable supporting frame, a driven shaft mounted in the frame, a stump boring mechanism including adjustable supports journaled at their inner ends upon the shaft and inclined upwardly and downwardly toward opposite sides of the frame, vertically and horizontally projecting boring heads carried in the same vertical plane by the outer portions of the said upper and lower supports respectively and pivotally adjustable with respect thereto, so that the boring line and range of one may intersect that of the other, and gearing connections between each of the said boring heads and the driven shaft, all for the purpose described.

2. In a machine of the character described, the combination of a portable supporting frame, a driven shaft mounted in the frame, stump boring mechanism including beams journaled at their inner ends upon the shaft and adjustable thereon, said beams being inclined upwardly and downwardly, means for supporting the beams in adjusted position, vertically and horizontally projecting boring heads carried in the same vertical plane by the outer portions of the said beams, so that the boring line and range of one may intersect that of the other, and gearing connections between the driven shaft and the said boring heads, all for the purpose described.

FRANKLIN A. LONG.

Witnesses:
 SOLON C. KEMON,
 PERRY B. TURPIN.